(12) United States Patent
Fujimoto

(10) Patent No.: US 9,585,126 B2
(45) Date of Patent: Feb. 28, 2017

(54) RADIO COMMUNICATION SYSTEM, RADIO BASE STATION, AND COMMUNICATION CONTROL METHOD

(75) Inventor: Shinobu Fujimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 38 days.

(21) Appl. No.: 14/000,595

(22) PCT Filed: Feb. 22, 2012

(86) PCT No.: PCT/JP2012/054331
§ 371 (c)(1),
(2), (4) Date: Aug. 20, 2013

(87) PCT Pub. No.: WO2012/115172
PCT Pub. Date: Aug. 30, 2012

(65) Prior Publication Data
US 2013/0329685 A1    Dec. 12, 2013

(30) Foreign Application Priority Data

Feb. 23, 2011    (JP) .................................. 2011-037708

(51) Int. Cl.
*H04W 72/04* (2009.01)
*H04L 5/00* (2006.01)
*H04W 48/12* (2009.01)
*H04L 1/00* (2006.01)
*H04B 7/04* (2006.01)
(Continued)

(52) U.S. Cl.
CPC ....... *H04W 72/0406* (2013.01); *H04L 5/0048* (2013.01); *H04W 48/12* (2013.01); *H04B 7/0421* (2013.01); *H04B 7/0617* (2013.01); *H04L 1/00* (2013.01); *H04W 16/10* (2013.01); *H04W 16/28* (2013.01); *H04W 72/042* (2013.01)

(58) Field of Classification Search
CPC .......... H04W 72/0406; H04W 72/042; H04W 48/12; H04W 16/10; H04W 16/28; H04L 1/00; H04L 5/0048; H04B 7/0617; H04B 7/0421

See application file for complete search history.

(56) References Cited

U.S. PATENT DOCUMENTS 6,718,184 B1 * 4/2004 Aiken et al. ............... 455/562.1
7,453,854 B2   11/2008 Fujishima et al.
(Continued)

FOREIGN PATENT DOCUMENTS

CN    1574721 A    2/2005
CN    101911796 A    12/2010

OTHER PUBLICATIONS

International Search Report; PCT/JP2012/054331; Mar. 19, 2012.
(Continued)

*Primary Examiner* — Parth Patel
*Assistant Examiner* — Kai Chang
(74) *Attorney, Agent, or Firm* — Studebaker & Brackett PC

(57) ABSTRACT

In the presence of an assignment of the downlink resource block to the UE2-1, the eNB1-1 requests the UE2-1 to transmit SRS in the frequency band corresponding to the comb 0, and in the absence of the assignment of the downlink resource block to the UE2-1, the eNB1-1 requests the UE2-1 to transmit SRS in the frequency band corresponding to the comb 1. The UE2-1 transmits the SRS of the frequency band corresponding to the request.

14 Claims, 7 Drawing Sheets

(51) Int. Cl.
*H04B 7/06* (2006.01)
*H04W 16/28* (2009.01)
*H04W 16/10* (2009.01)

(56) References Cited

U.S. PATENT DOCUMENTS

| | | | |
|---|---|---|---|
| 8,660,497 B1 * | 2/2014 | Zhang et al. | 455/63.1 |
| 8,780,790 B2 | 7/2014 | Sarkar | |
| 2004/0166903 A1 * | 8/2004 | Nakanishi | 455/562.1 |
| 2004/0235472 A1 * | 11/2004 | Fujishima et al. | 455/434 |
| 2009/0022253 A1 * | 1/2009 | Yoshida | H04B 1/76 |
| | | | 375/346 |
| 2009/0046641 A1 * | 2/2009 | Wang et al. | 370/329 |
| 2009/0088148 A1 * | 4/2009 | Chung et al. | 455/423 |
| 2009/0180435 A1 * | 7/2009 | Sarkar | 370/330 |
| 2009/0279512 A1 * | 11/2009 | Fujishima et al. | 370/336 |
| 2010/0054161 A1 * | 3/2010 | Montojo et al. | 370/280 |
| 2010/0111223 A1 * | 5/2010 | Thomas et al. | 375/296 |
| 2011/0007778 A1 * | 1/2011 | Kishiyama | H04B 1/713 |
| | | | 375/133 |
| 2011/0105167 A1 * | 5/2011 | Pan | H04B 7/0671 |
| | | | 455/507 |
| 2011/0134872 A1 * | 6/2011 | Nakao et al. | 370/329 |
| 2011/0171964 A1 * | 7/2011 | Lin | H04L 5/0023 |
| | | | 455/450 |
| 2011/0176593 A1 * | 7/2011 | Hultell | H04B 7/0404 |
| | | | 375/224 |
| 2011/0235555 A1 * | 9/2011 | Zhang et al. | 370/280 |
| 2011/0269489 A1 * | 11/2011 | Khoshnevis | H04L 25/0202 |
| | | | 455/507 |
| 2012/0057535 A1 * | 3/2012 | Zhang | H04W 72/0426 |
| | | | 370/329 |
| 2012/0207125 A1 * | 8/2012 | Takamatsu | 370/330 |
| 2012/0208467 A1 * | 8/2012 | Wang | H04B 7/0404 |
| | | | 455/42 |
| 2012/0252513 A1 * | 10/2012 | Kiyoshima | H04B 17/0042 |
| | | | 455/509 |
| 2013/0053078 A1 * | 2/2013 | Barbieri | H04B 7/024 |
| | | | 455/509 |
| 2013/0194908 A1 * | 8/2013 | Gao | H04L 5/0048 |
| | | | 370/203 |
| 2013/0201913 A1 * | 8/2013 | Niemela | 370/328 |
| 2013/0222182 A1 * | 8/2013 | Nakasato | 342/368 |
| 2013/0230018 A1 * | 9/2013 | Yagi | H04L 5/0048 |
| | | | 370/330 |
| 2013/0242797 A1 * | 9/2013 | Miyata | 370/252 |
| 2013/0273973 A1 * | 10/2013 | Sato | H04B 7/0615 |
| | | | 455/562.1 |

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8); pp. 1-83.

ZTE; "Consideration on Multi-user beamforming"; 3GPP TSG WG1 Meeting #56; R1-090636; Feb. 9-13, 2009; Athens, Greece; pp. 1-4.

Ericsson et al.; "Proposal on implicit derivation of comb per antenna port for SRS"; 3GPP TSG RAN WG1 #63bis; R1-110587; Jan. 17-22, 2011; Dublin, Ireland; pp. 1-3.

The First Office Action issued by the Chinese Patent Office on Dec. 3, 2015, which corresponds to Chinese Patent Application No. 201280009513.8 and is related to U.S. Appl. No. 14/000,595; with English language concise explanation.

* cited by examiner

RADIO COMMUNICATION SYSTEM, RADIO BASE STATION, AND COMMUNICATION CONTROL METHOD

TECHNICAL FIELD

The present invention relates to a radio communication system in which in radio communication between a radio base station and a radio terminal, the radio base station performs null steering control employing an antenna weight, a radio base station thereof, and a communication control method of the radio communication system.

BACKGROUND ART

In 3GPP (Third Generation Partnership Project), in a radio communication system corresponding to LTE (Long Term Evolution) for which standards are currently being set up, a radio base station eNB assigns a resource block in radio communication between the radio base station (eNB) and a radio terminal (UE) (for example, refer to NPL 1).

Furthermore, in the radio communication system corresponding to LTE, one of FDD (Frequency Division Duplex) and TDD (Time Division Duplex) is employed in the radio communication between the eNB and the UE.

CITATION LIST

Non Patent Literature

NPL 1: 3GPP TS 36.211 V8.7.0 "Physical Channels and Modulation", May 2009

SUMMARY OF THE INVENTION

It is assumed that in an LTE (TDD-LTE) radio communication system employing the TDD, the eNB assigns, to the UE, a downlink resource block of a frequency band overlapping a frequency band of a sounding reference signal (SRS) that is an uplink radio signal from the UE. In this case, at the time of transmitting a downlink radio signal by using the assigned downlink resource block, the eNB performs control (beamforming control) such that a beam is directed toward the UE to which the downlink radio signal is transmitted.

Furthermore, in order to ensure communication quality between the eNB and the UE, when the eNB receives the SRS from a UE (another UE) that performs radio communication with another eNB, the eNB determines that the other eNB assigns, to the other UE, a downlink resource block of a frequency band overlapping a frequency band of the SRS, and performs control (null steering control) such that a null is directed toward the other UE at the time of transmitting a downlink radio signal.

However, there is a case in which the other UE transmits SRS in order for the other eNB to acquire uplink channel information. In this case, the other eNB does not assign, to the other UE, the downlink resource block of the frequency band overlapping the frequency band of the SRS. Therefore, the null steering control in the eNB results in useless control. Furthermore, the eNB performs useless null steering control, resulting in the reduction of gain of beamforming control for the UE that performs the radio communication with the eNB.

Meanwhile, the other UE does not transmit SRS of a frequency band overlapping a frequency band in the absence of the assignment of the downlink resource block, thereby preventing the useless null steering control and preventing the reduction of gain of the beamforming control. However, when the other UE stops transmitting SRS, the other eNB is not able to acquire the uplink channel information.

Therefore, in view of the above-described problem, it is an object of the present invention to provide a radio communication system, a radio base station, and a communication control method with which it is possible to appropriately perform null steering control.

In order to solve the above-described problem, the present invention has a following feature. The first feature of the present invention is summarized as follows. A radio communication system, in which in radio communication between a radio base station (eNB1-1) and a radio terminal (UE2-1), the radio base station performs null steering control employing an antenna weight and assigns a downlink radio resource (downlink resource block) according to a pattern of a frequency band of an uplink reference signal (SRS) to be used in calculation of the antenna weight, switching the pattern of the frequency band of the uplink reference signal depending on presence or absence of the assignment of the downlink radio resource.

The radio communication system switches the pattern of the frequency band of the uplink reference signal depending on presence or absence of the assignment of the downlink radio resource. Thus, when the radio base station receives an uplink reference signal from a radio terminal performing radio communication with another radio base station, the radio base station is able to determine whether the reference signal is used when the other radio base station assigns the downlink radio resource or when the other radio base station acquires uplink channel information. Consequently, useless null steering control is prevented, and it is possible to further maintain gain when performing beamforming control.

The feature of the present invention is summarized as follows. The radio base station transmits an instruction for switching the pattern of the frequency band of the uplink reference signal, to the radio terminal.

The feature of the present invention is summarized as follows. The radio terminal receives the instruction for switching the pattern of the frequency band of the uplink reference signal, from the radio base station.

The feature of the present invention is summarized as follows. In the pattern of the frequency band of the uplink reference signal in the presence of the assignment of the downlink radio resource and the pattern of the frequency band of the uplink reference signal in the absence of the assignment of the downlink radio resource, frequencies are configured not to overlap.

The feature of the present invention is summarized as follows. The radio base station performs the null steering control when the pattern of the frequency band of the uplink reference signal from another radio terminal, which performs radio communication with another radio base station, is the pattern of the frequency band of the uplink reference signal in the presence of the assignment of the downlink radio resource, and stops the null steering control when the pattern of the frequency band of the uplink reference signal from the other radio terminal is the pattern of the frequency band of the uplink reference signal in the absence of the assignment of the downlink radio resource.

The feature of the present invention is summarized as follows. A radio base station, which performs null steering control employing an antenna weight and assigns a downlink radio resource according to a pattern of a frequency band of an uplink reference signal to be used in calculation of the antenna weight, in radio communication with a radio terminal, switches the pattern of the frequency band of the uplink reference signal depending on presence or absence of the assignment of the downlink radio resource.

The feature of the present invention is summarized as follows. A communication control method in a radio communication system, in which in radio communication between a radio base station and a radio terminal, the radio base station performs null steering control employing an antenna weight and assigns a downlink radio resource according to a pattern of a frequency band of an uplink reference signal to be used in calculation of the antenna weight, comprises: a step of switching, by the radio communication system, the pattern of the frequency band of the uplink reference signal depending on presence or absence of the assignment of the downlink radio resource.

DESCRIPTION OF THE EMBODIMENT

Figure 1:
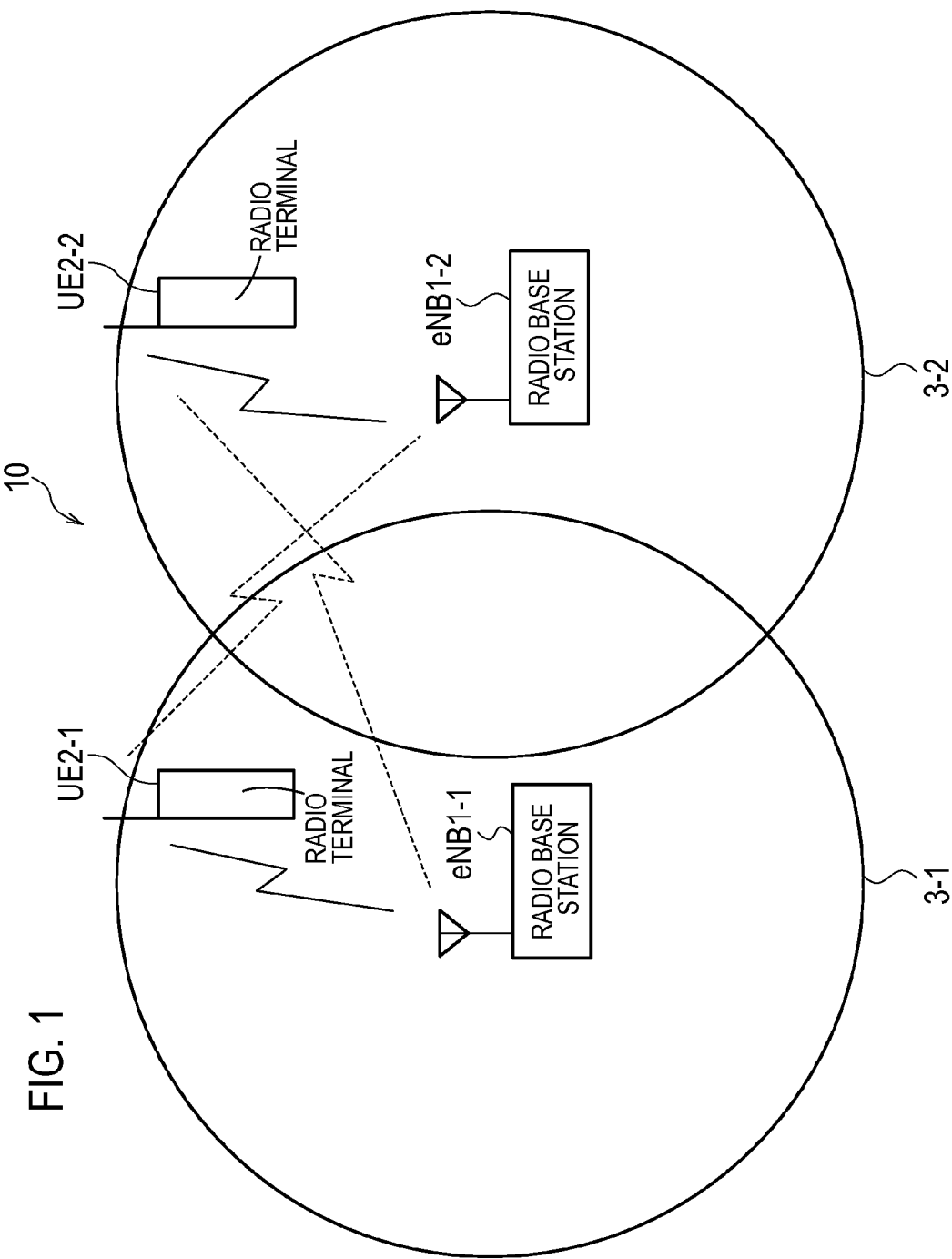
FIG. 1 is a diagram illustrating the entire schematic configuration of a radio communication system according to the embodiment of the present invention.

Next, with reference to the drawings, the embodiment of the present invention will be described. Specifically, a description will be given of the configuration of radio communication system, the operation of radio communication system, the operation and effect, and the other embodiments. In the drawings of the following embodiment, the same or similar reference signs are applied to the same or similar part.

(1) Configuration of Radio Communication System

FIG. 1 is a diagram illustrating the entire schematic configuration of a radio communication system 10 according to the embodiment of the present invention.

The radio communication system 10 illustrated in FIG. 1 is a TDD-LTE radio communication system. The radio communication system 10 includes a radio base station (eNB) 1-1 and a radio base station (eNB) 1-2 neighboring to each other, a radio terminal (UE) 2-1, and a radio terminal (UE) 2-2.

In FIG. 1, the eNB1-1 and the eNB1-2 constitute E-UTRAN (Evolved-UMTS Terrestrial Radio Access Network). The UE2-1 exists in a cell 3-1 that is a communication available area that is provided by the eNB1-1. The UE2-2 exists in a cell 3-2 that is a communication available area that is provided by the eNB1-2.

The UE2-1 is an object to which a resource block is assigned by the eNB1-1. The UE2-2 is an object to which a resource block is assigned by the eNB1-2. In this case, when the eNB1-1 is set as a reference, the UE2-1 is a serving radio terminal and the UE2-2 is a non-serving radio terminal. Furthermore, when the eNB1-2 is set as a reference, the UE2-2 is a serving radio terminal and the UE2-1 is a non-serving radio terminal.

Time division duplex is employed in radio communication between the eNB1-1 and the UE2-1, OFDMA (Orthogonal Frequency Division Multiplexing Access) is employed in downlink radio communication, and SC-FDMA (Single Carrier Frequency Division Multiple Access) is employed in uplink radio communication. Similarly, the time division duplex is employed in radio communication between the eNB1-2 and the UE2-2, the OFDMA is employed in downlink radio communication, and the SC-FDMA is employed in uplink radio communication. Here, a downlink indicates a direction from the eNB1-1 toward the UE2-1 and a direction from the eNB1-2 toward the UE2-2. An uplink indicates a direction from the UE2-1 toward the eNB1-1 and a direction from the UE2-2 toward the eNB1-2.

The eNB1-1 assigns a resource block (RB) to the UE2-1 in the cell 3-1 as a radio resource. Similarly, the eNB1-2 assigns a resource block to the UE2-2 in the cell 3-2.

The resource block includes a downlink resource block (downlink RB) to be used in the downlink radio communication and an uplink resource block (uplink RB) to be used in the uplink radio communication. A plurality of downlink resource blocks are arranged in the frequency direction and the time direction. Similarly, a plurality of uplink resource blocks are arranged in the frequency direction and the time direction.

Figure 2:
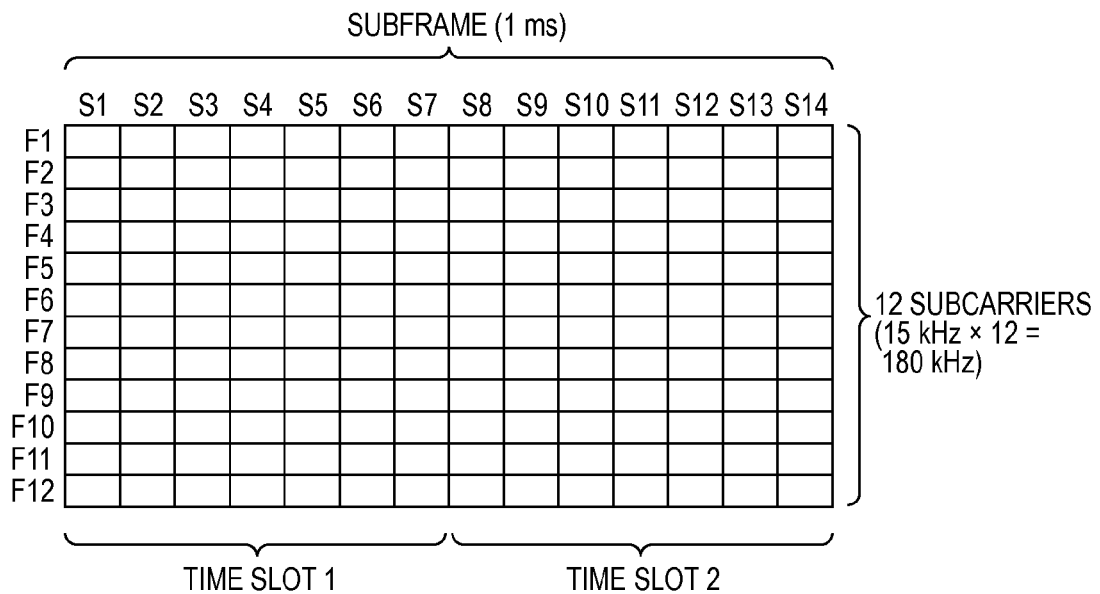
FIG. 2 is a diagram illustrating a format of the resource block according to the embodiment of the present invention.

FIG. 2 is a diagram illustrating a format of the resource block. As illustrated in FIG. 2, the resource block is configured by one subframe having a time length of 1 [ms] in the time direction. The subframe includes a time zone S1 to a time zone S14. Among the time zone S1 to the time zone S14, the time zone S1 to the time zone S7 constitute a first half slot (a slot 1) and the time zone S8 to the time zone S14 constitute a second half slot (a slot 2).

As illustrated in FIG. 2, the resource block has a frequency width of 180 [kHz] in the frequency direction. Furthermore, the resource block includes 12 subcarriers F1 to F12 having a frequency width of 15 [kHz].

Figure 3:
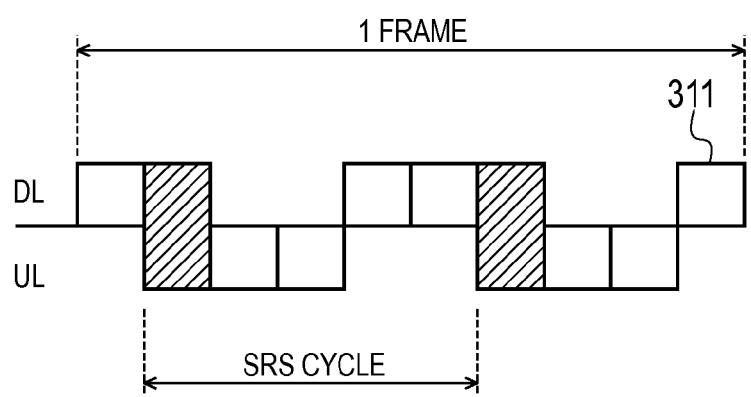
FIG. 3 is a diagram illustrating a format of the frame according to the embodiment of the present invention.

Furthermore, in the time direction, a plurality of subframes constitute one frame. FIG. 3 is a diagram illustrating a format of the frame. The frame illustrated in FIG. 3 is configured by 10 subframes 311. The frame includes the 10 subframes 311 in the sequence of a subframe of a downlink resource block, a subframe (a special subframe: SSF) of both of a downlink resource block and an uplink resource block, a subframe of an uplink resource block, a subframe of an uplink resource block, a subframe of a downlink resource block, a subframe of a downlink resource block, a special subframe, a subframe of an uplink resource block, a subframe of an uplink resource block, and a subframe of a downlink resource block. In the special subframes, within the subframe, the first half time slot is used for downlink radio communication and the latter half time slot is used for uplink radio communication across a guard time.

Furthermore, in the frequency direction, an entire frequency band of an available radio resource in the radio communication between the eNB and the UE, in other words, a frequency band (a frequency band to be assigned) assignable to the UE has a band corresponding to the number of a plurality resource blocks.

Figure 4:
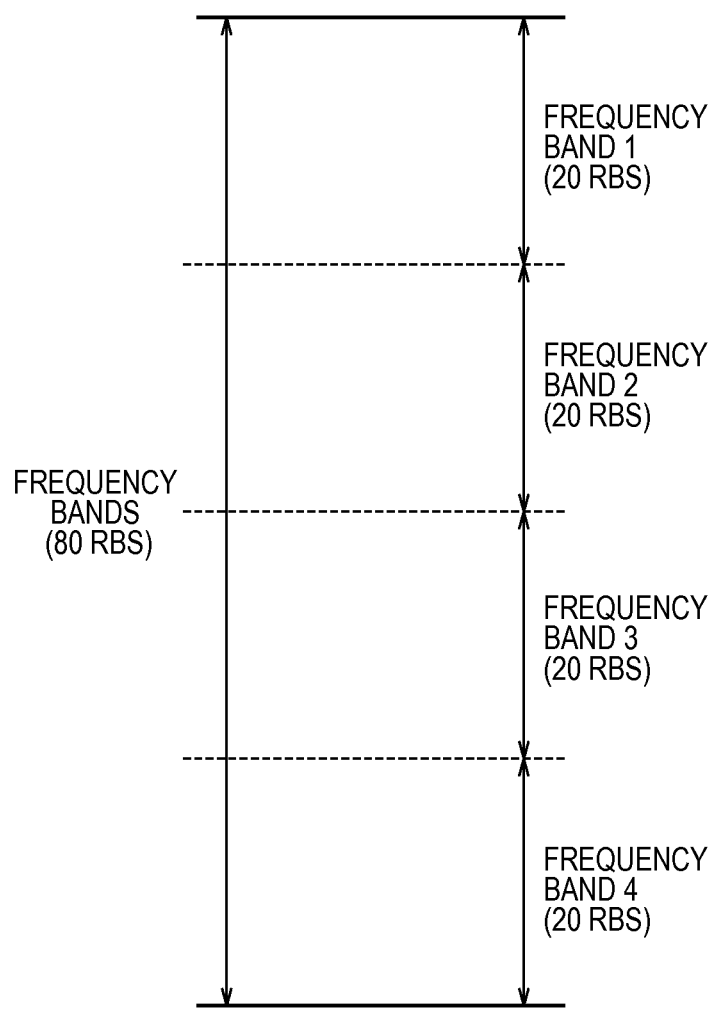
FIG. 4 is a diagram illustrating the configuration of a frequency band of the available radio resource in the radio communication between the radio base station and the radio terminal according to the embodiment of the present invention.

FIG. 4 is a diagram illustrating the configuration of a frequency band of the available radio resource in the radio communication between the eNB and the UE. An available entire frequency band in the radio communication between the eNB1-1 and the UE2-1 and the radio communication between the eNB1-2 and the UE2-2 is a band corresponding to 100 resource blocks. However, in the present embodiment, as illustrated in FIG. 4, in the radio communication between the eNB1-1 and the UE2-1 and the radio communication between the eNB1-2 and the UE2-2, a band corresponding to 80 resource blocks is assumed to be used. Furthermore, the frequency band including the 80 resource blocks is divided into a frequency band 1 to a frequency band 4, each of which has bands corresponding to 20 resource blocks, respectively.

The downlink resource block is configured by a control information channel (PDCCH: Physical Downlink Control CHannel) for downlink control information transmission and a shared data channel (PDSCH: Physical Downlink Shared CHannel) for downlink user data transmission, in the time direction.

On the other hand, in the uplink resource block, a control information channel (PUCCH: Physical Uplink Control CHannel) for uplink control information transmission is configured at both ends of the entire frequency band available in the uplink radio communication, and a shared data channel (PUSCH: Physical Uplink Shared CHannel) for uplink user data transmission is configured in the central part.

(1-1) Configuration of Radio Base Station

Figure 5:
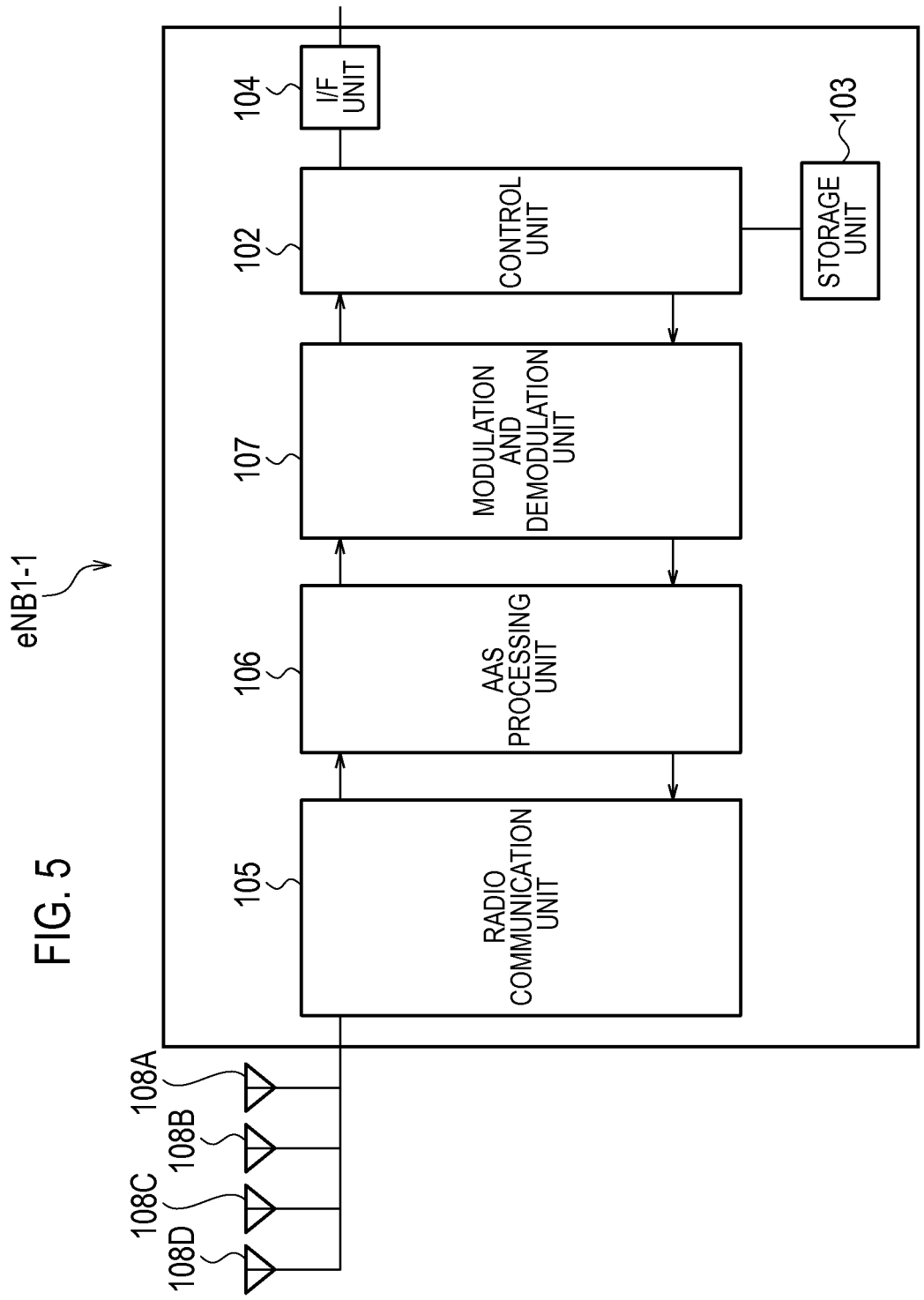
FIG. 5 is a configuration diagram of the radio base station according to the embodiment of the present invention.

FIG. 5 is a configuration diagram of the eNB1-1. In addition, the eNB1-2 also has the same configuration. As illustrated in FIG. 5, the eNB1-1 is a radio base station of an adaptive array scheme, in which an antenna weight is applied to a plurality of antennas, and includes a control unit 102, a storage unit 103, an I/F unit 104, a radio communication unit 105, an AAS (Adaptive Array System) processing unit 106, a modulation and demodulation unit 107, an antenna element 108A, an antenna element 108B, an antenna element 108C, and an antenna element 108D.

The control unit 102 is configured by, for example, a CPU, and controls various functions provided in the eNB1-1. Specifically, the control unit 102 sets a frequency band (an SRS transmission frequency band) that is used when the UE2-1 serving as a serving radio terminal transmits a sounding reference signal (SRS). Furthermore, the control unit 102 assigns an uplink resource block and a downlink resource block, which are radio resources, to the UE2-1.

The storage unit 103 is configured by, for example, a memory, and stores various types of information used for the control and the like of the eNB1-1.

The I/F unit 104 is able to communicate with another eNB through an X2 interface. Furthermore, the I/F unit 104 is able to communicate with EPC (Evolved Packet Core) that is not illustrated in the diagram, more specifically, with MME (Mobility Management Entity)/S-GW (Serving Gateway) through an S1 interface.

The radio communication unit 105 receives an uplink radio signal, which is transmitted from the UE2-1 serving as a serving radio terminal, through the antenna element 108A to the antenna element 108D. Furthermore, there is a case in which the radio communication unit 105 receives an uplink radio signal, which is transmitted from the UE2-2 serving as a non-serving radio terminal, through the antenna element 108A to the antenna element 108D. The radio communication unit 105 converts (down-converts) the received uplink radio signal to a baseband signal, and outputs the baseband signal to the AAS processing unit 106.

On the basis of the baseband signal, the AAS processing unit 106 sets an antenna weight (a reception weight), in which a signal-to-interference plus noise ratio (SINR) at the time of reception of the uplink radio signal from the UE2-1 is maximal, for each of the antenna element 108A to the antenna element 108D. Moreover, the AAS processing unit 106 outputs the baseband signal to the modulation and demodulation unit 107.

The modulation and demodulation unit 107 performs demodulation and decoding processes for the input baseband signal. In this way, data to be included in the uplink radio signal transmitted from the UE2-1 is obtained. The data is output to the control unit 102.

Furthermore, the modulation and demodulation unit 107 performs encoding and modulation of data from the control unit 102, thereby obtaining a baseband signal. Moreover, the modulation and demodulation unit 107 outputs the baseband signal to the AAS processing unit 106.

The AAS processing unit 106 sets an antenna weight (a transmission weight) at the time of transmitting a downlink radio signal to the UE2-1 serving as a serving radio terminal for each of the antenna element 108A to the antenna element 108D. Moreover, the AAS processing unit 106 outputs the baseband signal to the radio communication unit 105.

The radio communication unit 105 converts (up-converts) the base band signal to a downlink radio signal. Moreover, the radio communication unit 105 transmits the downlink radio signal through the antenna element 108A to the antenna element 108D.

(1-2) Configuration of Radio Terminal

Figure 6:
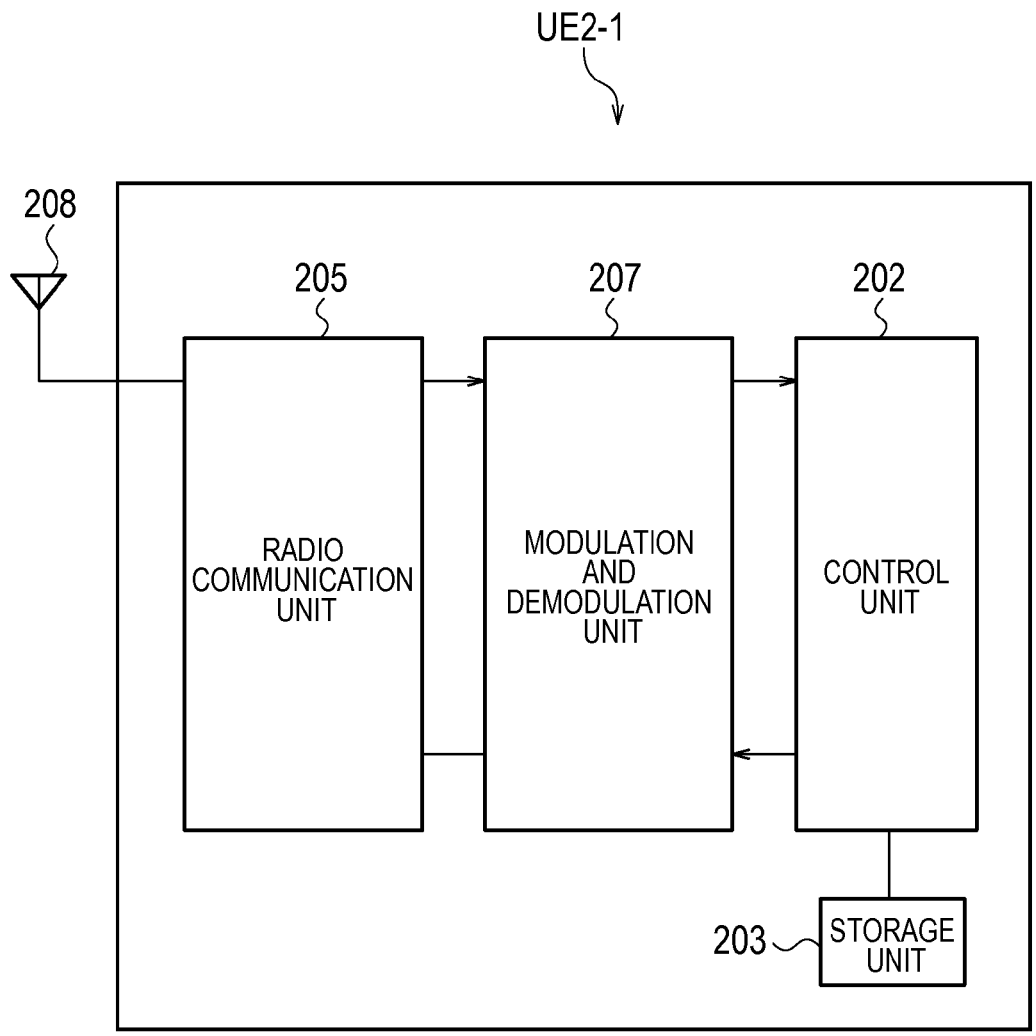
FIG. 6 is a configuration diagram of the radio terminal according to the embodiment of the present invention.

FIG. 6 is a configuration diagram of the UE2-1. In addition, the UE2-2 also has the same configuration. As illustrated in FIG. 6, the UE2-1 includes a control unit 202, a storage unit 203, a radio communication unit 205, a modulation and demodulation unit 207, and an antenna 208.

The control unit 202 is configured by, for example, a CPU, and controls various functions provided in the UE2-1. The storage unit 203 is configured by, for example, a memory, and stores various types of information used for the control and the like of the UE2-1.

The radio communication unit 205 receives a downlink radio signal that is transmitted from the eNB1-1 through the antenna 208. Moreover, the radio communication unit 205 converts (down-converts) the received downlink radio signal to a baseband signal, and outputs the baseband signal to the modulation and demodulation unit 207.

The modulation and demodulation unit 207 performs demodulation and decoding processes for the input baseband signal. In this way, data included in the downlink radio signal, which is transmitted from the eNB1-1, is obtained. The data is output to the control unit 202.

Furthermore, the modulation and demodulation unit 207 performs encoding and modulation of the data from the control unit 202 to obtain a baseband signal. Moreover, the modulation and demodulation unit 207 outputs the baseband signal to the radio communication unit 205.

The radio communication unit 205 converts (up-converts) the baseband signal to an uplink radio signal. Moreover, the radio communication unit 205 transmits the uplink radio signal through the antenna 208.

(1-3) SRS Transmission/Reception and Process Related to Null Steering Control

The control unit 102 of the eNB1-1 sets a frequency band (an SRS transmission frequency band) that is used when the UE2-1 serving as a serving radio terminal transmits a sounding reference signal (SRS) at a timing of a predetermined special subframe. Here, the SRS is a signal to be referred to in calculation of an antenna weight and acquisition of uplink channel information in the eNB1-1, and is an uplink radio signal of a radio frequency band.

Specifically, the control unit 102 sets, as the SRS transmission frequency band, one of a frequency band of a comb corresponding to a comb 0 and a frequency band corresponding to a comb 1 among transmission combs in the frequency direction.

Figure 7:
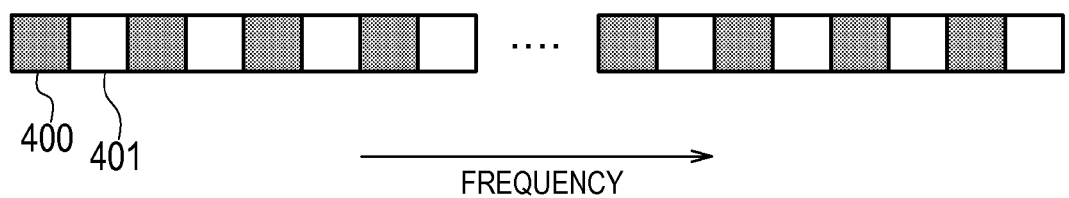
FIG. 7 is a diagram illustrating the configuration of the transmission comb according to the embodiment of the present invention.

FIG. 7 is a diagram illustrating the configuration of the transmission comb. As illustrated in FIG. 7, the transmission comb has a configuration in which a frequency band 400 of a comb corresponding to the comb 0 and a frequency band 401 corresponding to the comb 1 are alternately arranged.

In the case in which it is necessary to assign a downlink resource block to the UE2-1, the control unit 102 sets the frequency band 400 corresponding to the comb 0 as the SRS transmission frequency band. Here, the case in which it is necessary to assign the downlink resource block, for example, includes the case in which there is data to be transmitted to the UE2-1, the case in which there is an assignment request of the downlink resource block from the UE2-1, and the like.

Meanwhile, in the case in which it is not necessary to assign the downlink resource block to the UE2-1, the control unit 102 sets the frequency band 401 corresponding to the comb 1 as the SRS transmission frequency band.

Accordingly, in the case in which the downlink resource block is assigned to the UE2-1 and in the case in which the downlink resource block is not assigned to the UE2-1, the transmission frequency bands of SRSs that are transmitted from the UE2-1 are different from each other and do not overlap each other.

The control unit 102 sets information on the set SRS transmission frequency band in an RRC Connection Reconfiguration message. The information on the SRS transmission frequency band is information by which it is possible to uniquely recognize the frequency band corresponding to the comb 1 or the frequency band corresponding to the comb 0.

Moreover, the control unit 102 outputs the RRC Connection Reconfiguration message for the UE2-1, in which the SRS transmission frequency band information is set, to the modulation and demodulation unit 107.

The modulation and demodulation unit 107 performs encoding and modulation of the RRC Connection Reconfiguration message to obtain a baseband signal. The radio communication unit 105 converts the baseband signal to a downlink radio signal, and transmits the downlink radio signal to the UE2-1 through the antenna 108A to the antenna 108D.

The aforementioned setting of the SRS transmission frequency band by the eNB1-1 is also performed in the eNB1-2.

The radio communication unit 205 of the UE2-1 receives the downlink radio signal, which is transmitted from the eNB1-1, through the antenna 208. Moreover, the radio communication unit 205 converts (down-converts) the received downlink radio signal to a baseband signal. The modulation and demodulation unit 207 performs demodulation and decoding processes of the baseband signal to obtain the RRC Connection Reconfiguration message.

The control unit 202 of the UE2-1 recognizes the SRS transmission frequency band on the basis of the SRS transmission frequency band information that is set in the RRC Connection Reconfiguration message. Moreover, the control unit 202 transmits the recognized SRS transmission frequency band, specifically, SRS of the frequency band corresponding to the comb 0 or SRS of the frequency band corresponding to the comb 1, at a timing of a special subframe. The SRS of the frequency band corresponding to the comb 0 is used when the eNB1-1 assigns a downlink resource block to the UE2-1. The SRS of the frequency band corresponding to the comb 1 is used when the eNB1-1 acquires the uplink channel information.

The aforementioned transmission of the SRS by the UE2-1 is also performed in the UE2-2.

The radio communication unit 105 of the eNB1-1 receives SRS, which is transmitted from the UE2-1 serving as a serving radio terminal, and SRS, which is transmitted from the UE2-2 serving as a non-serving radio terminal, through the antenna 108A to the antenna 108D at the same timing of the special subframe. The radio communication unit 105 converts the received each SRS to a baseband signal, and outputs the baseband signal to the AAS processing unit 106. Furthermore, the radio communication unit 105 determines whether a frequency band of the SRS transmitted from the UE2-2 is the frequency band 400 corresponding to the comb 0 or the frequency band 401 corresponding to the comb 1, and outputs information on a result of the determination to the AAS processing unit 106.

The AAS processing unit 106 sets an antenna weight (a transmission weight) at the time of transmitting a downlink radio signal to the UE2-1 for each of the antenna 108A to the antenna 108D. Specifically, when the frequency band of the SRS transmitted from the UE2-2 is the frequency band 400 corresponding to the comb 0, the AAS processing unit 106 sets a desired wave direction of a radiation pattern to be directed toward the UE2-1, and sets an antenna weight, which was subject to null steering control, as the transmission weight, in the direction of the UE2-2. Meanwhile, when the frequency band of the SRS transmitted from the UE2-2 is the frequency band 401 corresponding to the comb 1, the AAS processing unit 106 sets the desired wave direction of the radiation pattern to be directed toward the UE2-1, and sets an antenna weight, which was not subject to the null steering control, as the transmission weight, in the direction of the UE2-2.

Then, in the case in which it is necessary to assign a downlink resource block to the UE2-1, the control unit 102 assigns a downlink resource block included in the frequency band of the SRS, to the UE2-1. At this time, the control unit 102 transmits an assignment message to the UE2-1, wherein the assignment message includes information and the like on a frequency of the assigned downlink resource block.

Figure 8:
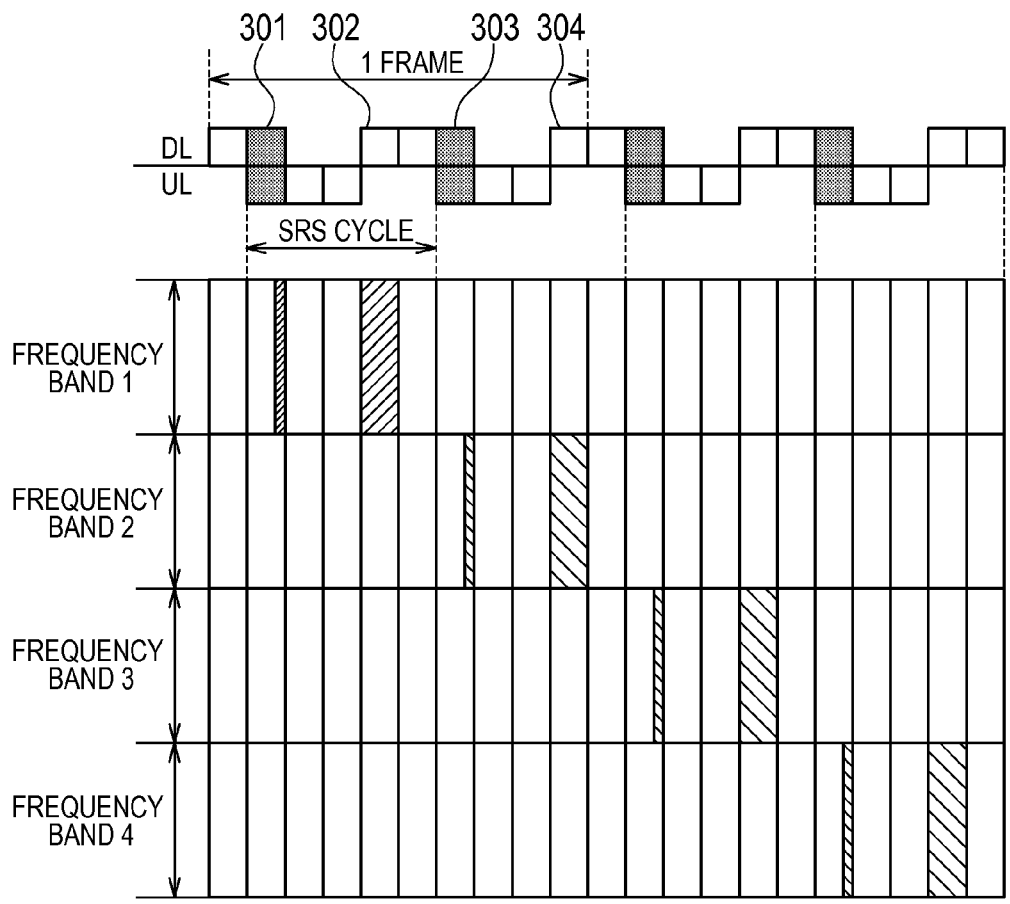
FIG. 8 is a diagram illustrating an example of correspondence of a frequency band of SRS and assigned downlink RB according to the embodiment of the present invention.

FIG. 8 is a diagram illustrating an example of correspondence of a frequency band of SRS and assigned downlink RB.

The eNB1-1 receives the SRS of the frequency band corresponding to the comb 0 in the frequency band 1 from the UE2-1 and receives the SRS of the frequency band corresponding to the comb 1 in the frequency band 1 from the UE2-2 at a timing of a special subframe 301. In this case, the control unit 102 assigns a downlink resource block to the UE2-1 at a timing of a downlink subframe 302. At this time, when the SRS of the frequency band corresponding to the comb 1 is received from the UE2-2, in other words, at the timing of the downlink subframe 302, the downlink resource block is not assigned to the UE2-2. Therefore, the AAS processing unit 106 sets the desired wave direction of the radiation pattern to be directed toward the UE2-1, and sets an antenna weight, which was not subject to the null steering control, as the transmission weight, in the direction of the UE2-2.

Furthermore, the eNB1-1 receives the SRS of the frequency band corresponding to the comb 0 in the frequency band 2 from the UE2-1 and receives the SRS of the frequency band corresponding to the comb 0 in the frequency band 2 from the UE2-2 at a timing of a special subframe 303. In this case, the control unit 102 assigns a downlink resource block to the UE2-1 at a timing of a downlink subframe 304. At this time, when the SRS of the frequency band corresponding to the comb 0 is received from the UE2-2, in other words, at the timing of the downlink subframe 304, the downlink resource block is assigned to the UE2-2. Therefore, the AAS processing unit 106 sets the desired wave direction of the radiation pattern to be directed toward the UE2-1, and sets an antenna weight, which was subject to the null steering control, as the transmission weight, in the direction of the UE2-2.

(2) Operation of Radio Communication System

Figure 9:
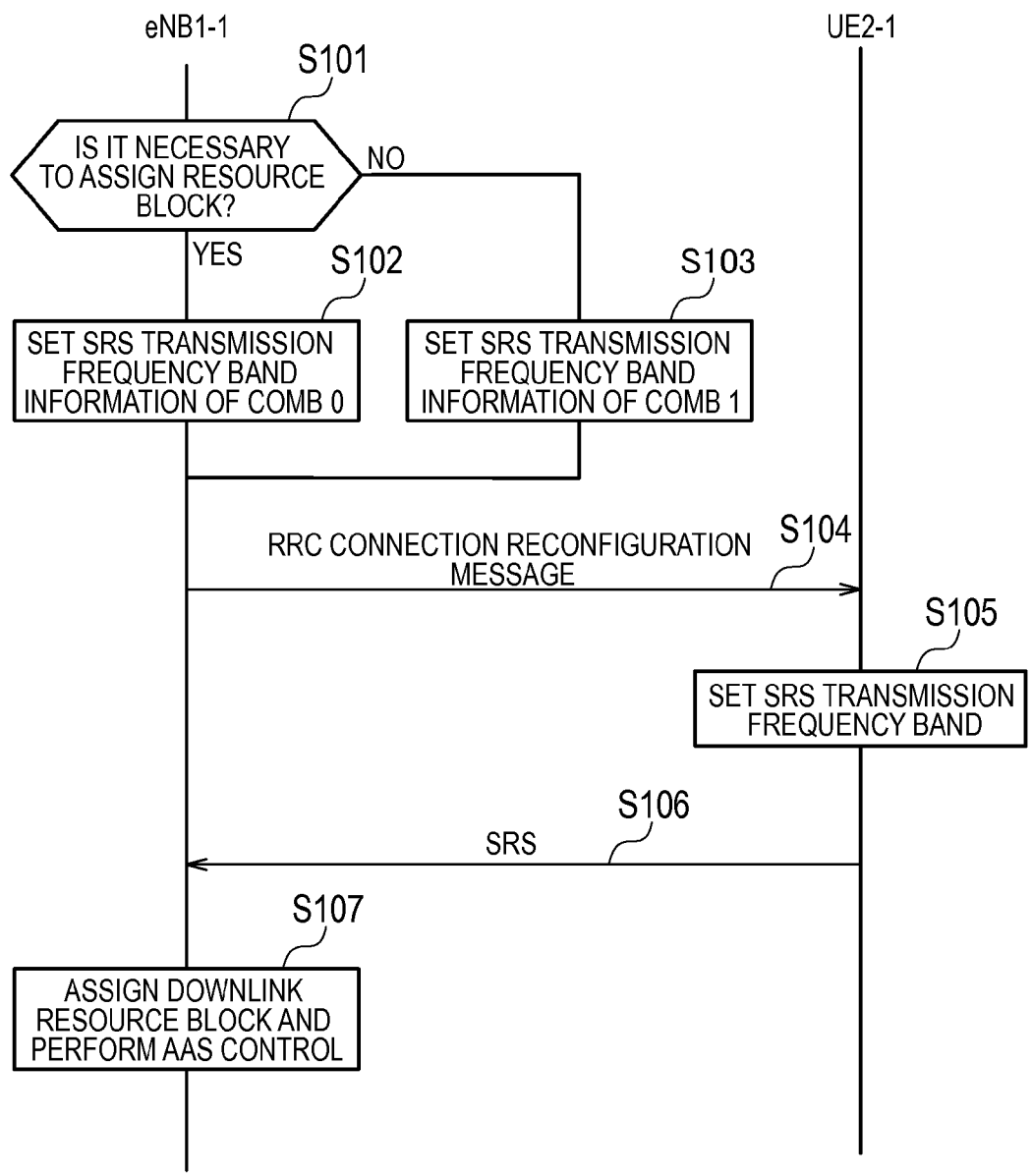
FIG. 9 is a sequence diagram illustrating the operation of the radio base station according to the embodiment of the present invention.

FIG. 9 is a sequence diagram illustrating the operation of the radio communication system 10.

In step S101, the eNB1-1 determines whether it is necessary to assign a resource block to the UE2-1. When it is necessary to assign the resource block to the UE2-1, the eNB1-1 sets SRS transmission frequency band information indicating the frequency band corresponding to the comb 0 in step S102. Meanwhile, when it is not necessary to assign the resource block to the UE2-1, the eNB1-1 sets SRS transmission frequency band information indicating the frequency band corresponding to the comb 1 in step S103.

After step S102 or step S103, the eNB1-1 transmits an RRC Connection Reconfiguration message including the SRS transmission frequency band information to the UE2-1 in step S104. The UE2-1 receives the RRC Connection Reconfiguration message.

In step S105, the UE2-1 sets an SRS transmission frequency band on the basis of the SRS transmission frequency band information. In step S106, the UE2-1 transmits SRS. The eNB1-1 receives the SRS.

In step S107, the eNB1-1 assigns a downlink resource block to the UE2-1, and performs adaptive array control. At this time, when the eNB1-1 receives SRS of the frequency band corresponding to the comb 0 the UE2-2 at a timing of receiving SRS from the UE2-1, the eNB1-1 sets the desired wave direction of the radiation pattern to be directed toward the UE2-1, and sets an antenna weight, which was subject to the null steering control, as the transmission weight, in the direction of the UE2-2. Furthermore, when the eNB1-1 receives SRS of the frequency band corresponding to the comb 1 from the UE2-2 at the timing of receiving the SRS from the UE2-1, the eNB1-1 sets the desired wave direction of the radiation pattern to be directed toward the UE2-1, and sets an antenna weight, which was not subject to the null steering control, as the transmission weight, in the direction of the UE2-2.

(3) Operation and Effect

As described above, according to the present embodiment, in the radio communication system 10, in the presence of an assignment of the downlink resource block to the UE2-1, the eNB1-1 requests the UE2-1 to transmit SRS in the frequency band corresponding to the comb 0, and in the absence of the assignment of the downlink resource block to the UE2-1, the eNB1-1 requests the UE2-1 to transmit SRS in the frequency band corresponding to the comb 1. The UE2-1 transmits the SRS of the frequency band corresponding to the request. Similarly, in the presence of the assignment of the downlink resource block to the UE2-2, the eNB1-2 requests the UE2-2 to transmit SRS in the frequency band corresponding to the comb 0, and in the absence of the assignment of the downlink resource block to the UE2-2, the eNB1-1 requests the UE2-2 to transmit SRS in the frequency band corresponding to the comb 1. The UE2-2 transmits the SRS of the frequency band corresponding to the request.

Thus, when the eNB1-1 receives the SRS from the UE2-2 that performs radio communication with the eNB1-2, the eNB1-1 is able to determine whether the SRS is used when the eNB1-2 assigns the downlink resource block or when the eNB1-2 acquires uplink channel information. Consequently, useless null steering control is prevented, and it is possible to further maintain gain when performing beamforming control.

(4) Other Embodiments

As mentioned above, the present invention has been described according to the embodiment. However, it must not be understood that the discussions and the drawings constituting a part of this disclosure limits the present invention. From this disclosure, various alternative embodiments, examples and operational techniques are apparent to those skilled in the art.

In the aforementioned embodiment, the case, in which one UE2-1 is subordinate to the eNB1-1, was described. However, even when two or more UEs exist, the present invention can be applied in the same manner.

In the aforementioned embodiments, the TDD-LTE radio communication system was described. However, the present invention can be applied in the same manner to all types of radio communication systems employing asymmetric radio communication in which a frequency band of an uplink radio signal to be assigned to a radio terminal is different from a frequency band of a downlink radio signal.

As mentioned above, it must be understood that the present invention includes various embodiments and the like that are not described herein.

Note that the entire content of the Japanese Patent Application No. 2011-037708 (filed on Feb. 23, 2011) is incorporated herein by reference.

INDUSTRIAL APPLICABILITY

As mentioned above, the radio communication system, the radio base station, and the communication control method according to the present invention is useful in radio communication, with which it is possible to appropriately perform null steering control.

The invention claimed is:
1. A radio communication system, for performing radio communication, comprising:
   a radio base station that performs null steering control employing an antenna weight and assigns a downlink radio resource according to a reference signal pattern of a frequency band of an uplink reference signal to be used in calculation of the antenna weight,
   a radio terminal that switches the reference signal pattern of the frequency band of the uplink reference signal depending on presence or absence of the assignment of the downlink radio resource from the radio base station, and a non-serving radio terminal to which the radio base station does not assign the downlink radio resource, wherein the radio base station directs a beam toward the radio terminal and directs a null toward the non-serving radio terminal in response to receiving an uplink reference signal based on the reference signal pattern corresponding to the presence of the assignment from the non-serving radio terminal, and the radio base station directs the beam toward the radio terminal and does not direct the null toward the non-serving radio terminal in response to receiving an uplink reference signal based on the reference signal pattern corresponding to the absence of the assignment from the non-serving radio terminal.

2. The radio communication system according to claim 1, wherein the radio base station transmits an instruction for switching the reference signal pattern of the frequency band of the uplink reference signal, to the radio terminal.

3. The radio communication system according to claim 2, wherein the radio terminal receives the instruction for switching the reference signal pattern of the frequency band of the uplink reference signal, from the radio base station.

4. The radio communication system according to claim 1, wherein in the reference signal pattern of the frequency band of the uplink reference signal in the presence of the assignment of the downlink radio resource and the reference signal pattern of the frequency band of the uplink reference signal in the absence of the assignment of the downlink radio resource, frequencies are configured not to overlap.

5. The radio communication system according to claim 1, wherein the radio base station performs the null steering control when the reference signal pattern of the frequency band of the uplink reference signal from another radio terminal, which performs radio communication with another radio base station, is the reference signal pattern of the frequency band of the uplink reference signal in the presence of the assignment of the downlink radio resource, and stops the null steering control when the reference signal pattern of the frequency band of the uplink reference signal from the other radio terminal is the reference signal pattern of the frequency band of the uplink reference signal in the absence of the assignment of the downlink radio resource.

6. The radio communication system of claim 1, wherein the reference signal pattern is a sounding reference signal (SRS) comb pattern.

7. The radio communication system of claim 1, wherein the radio terminal switches the reference signal pattern between two available sounding reference signal (SRS) comb patterns depending on presence or absence of the assignment of the downlink radio resource.

8. A radio base station, comprising:
a processor that performs null steering control employing an antenna weight and assigns a downlink radio resource according to a reference signal pattern of a frequency band of an uplink reference signal to be used in calculation of the antenna weight, in radio communication with a radio terminal, wherein
the reference signal pattern of the frequency band of the uplink reference signal is switched depending on presence or absence of the assignment of the downlink radio resource from the radio base station,
the processor directs a beam toward the radio terminal and directs a null toward a non-serving radio terminal to which the radio base station does not assign the downlink radio resource in response to receiving an uplink reference signal from the non-serving radio terminal based on the reference signal pattern corresponding to the presence of the assignment, and
the processor directs the beam toward the radio terminal and does not direct the null toward the non-serving radio terminal in response to receiving an uplink reference signal from the non-serving radio terminal based on the reference signal pattern corresponding to the absence of the assignment.

9. The radio base station of claim 8, wherein the reference signal pattern is a sounding reference signal (SRS) comb pattern.

10. The radio base station of claim 8, wherein the reference signal pattern of the frequency band of the uplink reference signal is switched between two available sounding reference signal (SRS) comb patterns depending on presence or absence of the assignment of the downlink radio resource.

11. A communication control method in a radio communication system, in which in radio communication between a radio base station and a radio terminal, the radio base station performs null steering control employing an antenna weight and assigns a downlink radio resource according to a reference signal pattern of a frequency band of an uplink reference signal to be used in calculation of the antenna weight, the communication control method comprising:
a step of switching, by the radio communication system, the reference signal pattern of the frequency band of the uplink reference signal depending on presence or absence of the assignment of the downlink radio resource from the radio base station,
a step of directing a beam from the radio base station toward the radio terminal and directing a null from the radio base station toward a non-serving radio terminal to which the radio base station does not assign the downlink radio resource in response to receiving an uplink reference signal from the non-serving radio terminal based on the reference signal pattern corresponding to the presence of the assignment, and
a step of directing the beam from the radio base station toward the radio terminal and not directing the null from the radio base station toward the non-serving radio terminal in response to receiving an uplink reference signal from the non-serving radio terminal based on the reference signal pattern corresponding to the absence of the assignment.

12. The method of claim 11, wherein the reference signal pattern is a sounding reference signal (SRS) comb pattern.

13. The method of claim 11, wherein the step of switching includes switching the reference signal pattern between two available sounding reference signal (SRS) comb patterns depending on presence or absence of the assignment of the downlink radio resource.

14. A radio communication system, for performing radio communication, comprising:
a first radio base station,
a radio terminal configured to be controlled by the first radio base station,
a non-serving radio terminal, and
a second radio base station configured to control the non-serving radio terminal, wherein
a first frequency band of a first reference signal pattern is used for transmitting an uplink reference signal to be used in calculation of an antenna weight when an assignment of a downlink radio resource is present, a second frequency band of a second reference signal pattern is used for transmitting the uplink reference signal when an assignment of a downlink radio resource is absent, the second frequency band does not overlap the first frequency band, the first radio base station is configured to:
  receive an first uplink reference signal from the radio terminal by use of the first frequency band,
  receive an second uplink reference signal from the non-serving radio terminal, and
  perform null steering control employing the antenna weight depending on a reference signal pattern of a frequency band used for transmitting the second uplink reference signal, the radio base station directs a beam toward the radio terminal and directs a null toward the non-serving radio terminal in response to the reference signal pattern being the first reference signal pattern, and the radio base station directs the beam toward the radio terminal and does not direct the null toward the non-serving radio terminal in response to the reference signal pattern being the second reference signal pattern.

* * * * *